(12) United States Patent
Ding et al.

(10) Patent No.: US 12,489,703 B2
(45) Date of Patent: Dec. 2, 2025

(54) POLICY TRANSMISSION METHOD AND APPARATUS, AND NETWORK TRANSMISSION SYSTEM

(71) Applicant: Huawei Technologies Co., Ltd., Shenzhen (CN)

(72) Inventors: Xiangfeng Ding, Beijing (CN); Haibo Wang, Beijing (CN); Lili Wang, Beijing (CN); Lei Li, Beijing (CN); Yaqun Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 17/934,390

(22) Filed: Sep. 22, 2022

(65) Prior Publication Data

US 2023/0009328 A1    Jan. 12, 2023

Related U.S. Application Data

(63) Continuation of application No. PCT/CN2021/070298, filed on Jan. 5, 2021.

(30) Foreign Application Priority Data

Mar. 23, 2020   (CN) .......................... 202010207793.X

(51) Int. Cl.
*H04L 9/40*     (2022.01)
*H04L 45/033*   (2022.01)
*H04L 45/302*   (2022.01)
*H04L 45/745*   (2022.01)

(52) U.S. Cl.
CPC .......... *H04L 45/308* (2013.01); *H04L 45/033* (2022.05); *H04L 63/0236* (2013.01); *H04L 63/20* (2013.01); *H04L 45/745* (2013.01)

(58) Field of Classification Search
CPC .... H04L 45/745; H04L 63/0236; H04L 63/20
See application file for complete search history.

(56) References Cited

U.S. PATENT DOCUMENTS

| | | | |
|---|---|---|---|
| 9,531,627 B1 | 12/2016 | Alvarez et al. | |
| 2005/0094566 A1* | 5/2005 | Hares | H04L 45/02 370/255 |
| 2006/0203744 A1 | 9/2006 | Patel et al. | |

(Continued)

FOREIGN PATENT DOCUMENTS

| | | |
|---|---|---|
| CN | 101674245 A | 3/2010 |
| CN | 102611632 A | 7/2012 |

(Continued)

OTHER PUBLICATIONS

Kao, C.-J. et al., "Source filtering in IP multicast routing," Proceedings Ninth International Conference on Network Protocols (ICNP 2001), Riverside, CA, US, Nov. 11-14, 2001, pp. 82-90.

(Continued)

*Primary Examiner* — Gil H. Lee
(74) *Attorney, Agent, or Firm* — Slater Matsil, LLP

(57) ABSTRACT

A method includes: When receiving at least one policy, a first network device sends one or more policies in the at least one policy to a second network device based on filtering information. The filtering information includes a policy address family identifier and a device identifier of the second network device.

20 Claims, 4 Drawing Sheets

(56) References Cited

U.S. PATENT DOCUMENTS

| | | | | |
|---|---|---|---|---|
| 2010/0110928 A1* | 5/2010 | Elias | ............... | H04L 45/32 370/254 |
| 2011/0145702 A1* | 6/2011 | Kakehi | ............... | G06F 21/6209 715/255 |
| 2013/0117449 A1* | 5/2013 | Hares | ............... | H04L 45/04 709/225 |
| 2015/0089620 A1* | 3/2015 | Manza | ............... | H04L 63/10 726/8 |
| 2017/0093641 A1* | 3/2017 | Utgikar | ............... | H04L 45/036 |
| 2019/0089628 A1 | 3/2019 | Amante | | |
| 2020/0028758 A1* | 1/2020 | Tollet | ............... | H04L 67/10 |

FOREIGN PATENT DOCUMENTS

| | | |
|---|---|---|
| CN | 106059917 A | 10/2016 |
| CN | 106161226 A | 11/2016 |
| CN | 106921572 A | 7/2017 |
| CN | 107547381 A | 1/2018 |
| CN | 108471629 A | 8/2018 |
| CN | 108881041 A | 11/2018 |
| CN | 109379289 A | 2/2019 |
| CN | 109412951 A | 3/2019 |
| CN | 110505152 A | 11/2019 |
| CN | 110535765 A | 12/2019 |
| CN | 110611615 A | 12/2019 |
| CN | 110875882 A | 3/2020 |

OTHER PUBLICATIONS

Chen, E. et al., "Outbound Route Filtering Capability for BGP-4" Network Working Group, RFC 5291, Aug. 2008, 12 pages.

Wu, X. et al., "Research and realization of BGP4+ routing policy based on IPv6", Computer Engineering and Design, vol. 28, No. 17, Sep. 2007, 4 pages.

Jeng, H. et al., "Covering Prefixes Outbound Route Filter for BGP-4", Internet Engineering Task Force (IETF), RFC 7543, May 2015, 21 pages.

Previdi, S. et al., "Advertising Segment Routing Policies in BGP"; draft-ietf-idr-segment-routing-te-policy-07, Jul. 5, 2019, 80 pages.

Li, et al, Huawei, "BGP Extensions for Routing Policy Distribution (RPD); draft-li-idr-flowspec-rpd-05", Internet-Draft: Network Working Group, Internet Engineering Task Force, IETF; Standard Working Draft, Internet Soc No. 5, Jul. 7, 2019 (Jul. 7, 2019), pp. 1-18, XP015133927, total 18 pages.

\* cited by examiner

US 12,489,703 B2

POLICY TRANSMISSION METHOD AND APPARATUS, AND NETWORK TRANSMISSION SYSTEM

CROSS-REFERENCE TO RELATED APPLICATIONS

This application is a continuation of International Application No. PCT/CN2021/070298, filed on Jan. 5, 2021, which claims priority to Chinese Patent Application No. 202010207793.X, filed on Mar. 23, 2020. The disclosures of the aforementioned applications are hereby incorporated by reference in their entireties.

TECHNICAL FIELD

This application relates to the field of communication technologies, and in particular, to a policy transmission method and apparatus, and a network transmission system.

BACKGROUND

A network transmission system includes a controller and a plurality of network devices. The controller may establish connections to the plurality of network devices based on the Border Gateway Protocol (BGP), and the controller can send segment routing (SR) policies to the network devices. In the plurality of network devices, a pair of network devices that establish a connection relationship based on the BGP may be referred to as neighbor network devices of each other. The controller can directly send an SR policy to a network device, or send the SR policy to the network device via a neighbor network device of the network device.

When the controller sends an SR policy to a network device serving as a route reflector (RR), the RR needs to determine whether the SR policy is sent by the controller to the RR. If the SR policy is sent by the controller to the RR, the RR may receive and save the SR policy. If the SR policy is not sent by the controller to the RR, the RR reflects the SR policy to each neighbor network device connected to the RR. Because a plurality of neighbor network devices are usually connected to one RR, each neighbor network device of the RR receives a large quantity of SR policies. The SR policies may include not only an SR policy related to the network device but also a large quantity of useless SR policies for the network device. Consequently, network transmission load is increased, processing load of the network device that receives the SR policies from the RR is increased, and overall efficiency of the network transmission system is reduced.

SUMMARY

This application provides a policy transmission method and apparatus, and a network transmission system, to reduce problems of low transmission efficiency of a network transmission system and heavy processing load of a network device that are caused by transmission of a large quantity of useless policies in the network transmission system. The technical solutions are as follows.

According to a first aspect, a policy transmission method is provided. The method includes: A first network device receives at least one policy. Then, the first network device sends one or more policies in the at least one policy to a second network device based on filtering information. The filtering information based on which the first network device sends the policy includes a policy address family identifier and a device identifier of the second network device. A type of the policy sent by the first network device to the second network device belongs to a type indicated by the policy address family identifier. In addition, the policy sent by the first network device to the second network device includes the device identifier of the second network device.

The first network device may filter the at least one received policy based on the policy address family identifier and the device identifier of the second network device in the filtering information, and send a policy obtained through filtering to the second network device. The policy obtained by the first network device through filtering needs to meet the following conditions: A type of the policy belongs to the type indicated by the policy address family identifier, and the policy includes the device identifier of the second network device.

The device identifier of the second network device may be a router identifier (router ID) of the second network device, or a device identifier of another type, for example, an identification (ID) of the second network device. The policy received by the first network device may be, for example, a policy sent by a controller, may be a policy sent by another network device such as a neighbor network device, or may be a policy configured by a network administrator on the first network device. The policy may also be referred to as policy-based routing. The policy may be a policy of any type, for example, an SR policy, a flow specification (FlowSpec), or route policy distribution (RPD). The SR policy may be an SR policy of any type, for example, an internet protocol version 4 (IPV4) SR policy or an internet protocol version 6 (IPv6) SR policy. Correspondingly, the policy type indicated by the policy address family identifier may include a policy of any type.

In the policy transmission method provided in this application, the first network device can send the one or more policies in the at least one received policy to the second network device based on the filtering information. The type of the one or more policies belongs to the type indicated by the policy address family identifier, and the one or more policies include the device identifier of the second network device. It can be learned that the policy sent by the first network device to the second network device is a policy to be sent to a specified address of the second network device, so that the first network device is prevented from sending a policy unrelated to the second network device to the second network device, to reduce transmission of useless policies in a network transmission system, reduce load of the network transmission system, and improve overall efficiency of the network transmission system.

According to the policy transmission method provided in this application, the first network device performs policy filtering, and the first network device can send the policy obtained through filtering to the second network device. On a transmission path (where the transmission path may be a part of a complete transmission path) including the first network device and the second network device, the first network device may be referred to as a transmit end, and the second network device may be referred to as a receive end. Therefore, it is equivalent to implementing policy filtering at the transmit end in this embodiment of this application, so that a quantity of policies transmitted on the transmission path is reduced, and processing pressure of the receive end is also reduced.

Optionally, the first network device obtains an address of the second network device, where the address of the second network device corresponds to the device identifier of the second network device. That the first network device sends one or more policies in the at least one policy to a second network device based on filtering information includes: The first network device sends the one or more policies to the second network device based on the address of the second network device and the filtering information. The address of the second network device may be any address of the second network device, for example, an internet protocol (IP) address or a media access control (MAC) address. When the first network device is a device of a type, for example, a route reflector, the first network device usually needs to send (reflect) policies to a plurality of downstream routers connected to the first network device. However, the address of the second network device is associated with the device identifier of the second network device, so that the first network device can send a policy related to the second network device only to the second network device (one of the downstream routers). The other downstream routers no longer receive the policy related to the second network device, so that accuracy of sending the policy and network transmission efficiency are improved.

Optionally, the filtering information further includes refined filtering information. In this case, the first network device may filter the at least one received policy based on the policy address family identifier, the device identifier of the second network device, and the refined filtering information in the filtering information, and send a policy obtained through filtering to the second network device. The policy obtained by the first network device through filtering needs to meet the following conditions: A type of the policy belongs to the type indicated by the policy address family identifier, the policy includes the device identifier of the second network device, and the policy includes the refined filtering information. When filtering the at least one received policy, the first network device may filter the policy based on the three types of information, namely, the policy address family identifier, the device identifier of the second network device, and the refined filtering information.

Optionally, a type of the refined filtering information includes at least one of a distinguisher, a policy color, and an endpoint, where the identifier, the policy color, and the endpoint are attributes that can be carried in the policy.

Optionally, the filtering information may be sent by the second network device to the first network device. In this case, the first network device may determine, for example, based on the fact that the filtering information is sent by the second network device, a correspondence between the address of the second network device and the device identifier in the filtering information sent by the second network device.

Optionally, in a first manner in which the second network device sends the filtering information to the first network device, the filtering information is carried in an ORF packet, and the second network device may send the filtering information to the first network device by sending the ORF packet to the first network device. Correspondingly, the first network device may obtain the filtering information from the second network device, where the filtering information is carried in the outbound route filter (ORF) packet, and the ORF packet includes an address family identifier field, a subsequent address family identifier field, and an ORF entry field. The policy address family identifier is carried in the address family identifier field and the subsequent address family identifier field, and the device identifier of the second network device is carried in the ORF entry field.

Optionally, the ORF packet may further include an ORF type field, and the ORF type field indicates that the ORF packet carries the filtering information and is used for policy filtering.

Optionally, in a second manner in which the second network device sends the filtering information to the first network device, the filtering information is carried in a covering prefixes outbound route filter (CP-ORF) packet, and the second network device may send the filtering information to the first network device by sending the CP-ORF packet to the first network device. Correspondingly, the first network device may obtain the filtering information from the second network device, where the filtering information is carried in the covering prefixes outbound route filter CP-ORF packet, and the CP-ORF packet includes an address family identifier field, a subsequent address family identifier field, and a virtual private network route target field. The policy address family identifier is carried in the address family identifier field and the subsequent address family identifier field, and the device identifier of the second network device is carried in the virtual private network route target field.

Optionally, in a third manner in which the second network device sends the filtering information to the first network device, the filtering information is carried in a CP-ORF packet, and the second network device may send the filtering information to the first network device by sending the CP-ORF packet to the first network device. Correspondingly, the first network device may obtain the filtering information from the second network device, where the filtering information is carried in the covering prefixes outbound route filter CP-ORF packet, and the CP-ORF packet includes an address family identifier field, a subsequent address family identifier field, a virtual private network route target field, a route type field, and a host address field. The policy address family identifier is carried in the address family identifier field and the subsequent address family identifier field, and the device identifier of the second network device is carried in the virtual private network route target field. When the filtering information includes the refined filtering information, the refined filtering information is carried in the host address field, and the route type field is used to indicate the type included in the refined filtering information. For example, different values of the route type field may correspond to different combination schemes of the refined filtering information, and any one or a combination of the distinguisher, the policy color, and the endpoint corresponds to a different value of the route type field.

The first network device receives the filtering information by using the ORF packet or the CP-ORF packet, so that compatibility and inheritance of packet processing by a system can be improved.

The foregoing case is described by using an example in which the second network device sends the filtering information to the first network device, so that the first network device obtains the filtering information. In another case, the first network device may alternatively obtain the filtering information in another manner. For example, the first network device obtains the filtering information from the controller. Optionally, the filtering information is carried in a border gateway protocol BGP packet. In this case, the controller may send the filtering information to the first network device by sending the BGP packet to the first network device.

In this application, the second network device (or the controller) may send the filtering information to the first network device, so that the first network device filters the received policy based on the filtering information, and sends the policy obtained through filtering to the second network device. In this way, transmission efficiency of a network link is improved. In addition, the second network device used as the receive end may receive only a policy expected by the second network device, so that receiving pressure is reduced.

Optionally, the first network device in this application is a route reflector, so that a quantity of routes reflected by the route reflector to the downstream routers is greatly reduced, and network transmission pressure is reduced. The first network device may alternatively be a network device that is of another type and that needs to resolve a similar problem in another application scenario.

According to a second aspect, a policy transmission method is provided. The method includes: A second network device sends filtering information to a first network device. Then, the second network device receives a policy sent by the first network device, where a type of the policy belongs to a type indicated by a policy address family identifier, and the policy includes a device identifier of the second network device. The filtering information includes the policy address family identifier and the device identifier of the second network device. The second network device can send the filtering information to the first network device. Therefore, the first network device can filter the received policy based on the filtering information, and send, to the second network device, a policy that is obtained through filtering and that is expected by the second network device. The second network device used as a receive end receives only the policy expected by the second network device, so that receiving pressure is reduced. In addition, because a quantity of policies that need to be transmitted is reduced, transmission efficiency of a network link is also improved.

Optionally, the filtering information further includes refined filtering information. In this case, the first network device may filter at least one received policy based on the policy address family identifier, the device identifier of the second network device, and the refined filtering information in the filtering information, and send a policy obtained through filtering to the second network device. The policy obtained by the first network device through filtering needs to meet the following conditions: A type of the policy belongs to the type indicated by the policy address family identifier, the policy includes the device identifier of the second network device, and the policy includes the refined filtering information. When filtering the at least one received policy, the first network device may first perform preliminary filtering based on the policy address family identifier and the device identifier of the second network device to obtain some policies, and then filter these policies based on the refined filtering information.

Optionally, a type of the refined filtering information includes at least one of a distinguisher, a policy color, and an endpoint.

Optionally, in a first manner in which the second network device sends the filtering information to the first network device, the filtering information is carried in an ORF packet, and the second network device may send the filtering information to the first network device by sending the ORF packet to the first network device. The ORF packet includes an address family identifier field, a subsequent address family identifier field, and an ORF entry field. The policy address family identifier is carried in the address family identifier field and the subsequent address family identifier field, and the device identifier of the second network device is carried in the ORF entry field.

Optionally, the ORF packet may further include an ORF type field, and the ORF type field indicates that the ORF packet carries the filtering information and is used for policy filtering.

Optionally, in a second manner in which the second network device sends the filtering information to the first network device, the filtering information is carried in a CP-ORF packet, and the second network device may send the filtering information to the first network device by sending the CP-ORF packet to the first network device. The CP-ORF packet includes an address family identifier field, a subsequent address family identifier field, and a virtual private network route target field. Correspondingly, the policy address family identifier is carried in the address family identifier field and the subsequent address family identifier field, and the device identifier of the second network device is carried in the virtual private network route target field.

Optionally, in a third manner in which the second network device sends the filtering information to the first network device, the filtering information is carried in a CP-ORF packet, and the second network device may send the filtering information to the first network device by sending the CP-ORF packet to the first network device. The CP-ORF packet includes an address family identifier field, a subsequent address family identifier field, a virtual private network route target field, a route type field, and a host address field. The policy address family identifier is carried in the address family identifier field and the subsequent address family identifier field, and the device identifier of the second network device is carried in the virtual private network route target field. When the filtering information includes the refined filtering information, the refined filtering information is carried in the host address field, and the route type field is used to indicate the type included in the refined filtering information. For example, different values of the route type field may correspond to different combination schemes of the refined filtering information, and any one or a combination of the distinguisher, the policy color, and the endpoint corresponds to a different value of the route type field.

The second network device sends the filtering information by using the ORF packet or the CP-ORF packet, so that compatibility and inheritance of packet processing by a system can be improved.

Optionally, the method includes: The second network device sends an address of the second network device to the first network device, where the address of the second network device corresponds to the device identifier of the second network device. When sending the policy to the second network device, the first network device may determine the address of the second network device based on the device identifier of the second network device, and send the policy to the second network device based on the address of the second network device.

According to a third aspect, a policy transmission apparatus is provided. The policy transmission apparatus includes: a receiving module, configured to receive at least one policy; and a sending module, configured to send one or more policies in the at least one policy to a second network device based on filtering information, where the filtering information includes a policy address family identifier and a device identifier of the second network device, a type of the one or more policies belongs to a type indicated by the policy address family identifier, and the one or more policies include the device identifier of the second network device.

In the policy transmission apparatus provided in this application, the sending module can send the one or more policies in the at least one received policy to the second network device based on the filtering information. The type of the one or more policies belongs to the type indicated by the policy address family identifier, and the one or more policies include the device identifier of the second network device. It can be learned that the policy sent by a first network device to the second network device is a policy to be sent to the second network device, so that the first network device is prevented from sending a policy unrelated to the second network device to the second network device, to reduce transmission of useless policies in a network transmission system, and reduce load of the network transmission system.

In this application, the first network device performs policy filtering, and the first network device can send a policy obtained through filtering to the second network device. On a transmission path (where the transmission path may be a part of a complete transmission path) including the first network device and the second network device, the first network device may be referred to as a transmit end, and the second network device may be referred to as a receive end. Therefore, it is equivalent to implementing policy filtering at the transmit end in this embodiment of this application, so that a quantity of policies transmitted on the transmission path is reduced, and processing pressure of the receive end is also reduced.

Optionally, the policy transmission apparatus further includes: a first obtaining module, configured to obtain an address of the second network device, where the address of the second network device corresponds to the device identifier of the second network device; and the sending module is configured to send the one or more policies to the second network device based on the address of the second network device and the filtering information.

Optionally, the filtering information further includes refined filtering information. In this case, the first network device may filter the at least one received policy based on the policy address family identifier, the device identifier of the second network device, and the refined filtering information in the filtering information, and send a policy obtained through filtering to the second network device. The policy obtained by the first network device through filtering needs to meet the following conditions: A type of the policy belongs to the type indicated by the policy address family identifier, the policy includes the device identifier of the second network device, and the policy includes the refined filtering information. When filtering the at least one received policy, the first network device may first perform preliminary filtering based on the policy address family identifier and the device identifier of the second network device to obtain some policies, and then filter these policies based on the refined filtering information.

Optionally, a type of the refined filtering information includes at least one of a distinguisher, a policy color, and an endpoint, where the identifier, the policy color, and the endpoint are attributes that can be carried in the policy.

Optionally, in a first manner in which the second network device sends the filtering information to the first network device, the filtering information is carried in an ORF packet, and the second network device may send the filtering information to the first network device by sending the ORF packet to the first network device. Correspondingly, the policy transmission apparatus further includes a second obtaining module, configured to obtain the filtering information from the second network device, where the filtering information is carried in the outbound route filter ORF packet. The ORF packet includes an address family identifier field, a subsequent address family identifier field, and an ORF entry field. The policy address family identifier is carried in the address family identifier field and the subsequent address family identifier field, and the device identifier of the second network device is carried in the ORF entry field.

Optionally, the ORF packet may further include an ORF type field, and the ORF type field indicates that the ORF packet carries the filtering information and is used for policy filtering.

Optionally, in a second manner in which the second network device sends the filtering information to the first network device, the filtering information is carried in a CP-ORF packet, and the second network device may send the filtering information to the first network device by sending the CP-ORF packet to the first network device. Correspondingly, the policy transmission apparatus further includes a third obtaining module, configured to obtain the filtering information from the second network device. The filtering information is carried in the CP-ORF packet. The CP-ORF packet includes an address family identifier field, a subsequent address family identifier field, and a virtual private network route target field. Correspondingly, the policy address family identifier is carried in the address family identifier field and the subsequent address family identifier field, and the device identifier of the second network device is carried in the virtual private network route target field.

Optionally, in a second manner in which the second network device sends the filtering information to the first network device, the filtering information is carried in a CP-ORF packet, and the second network device may send the filtering information to the first network device by sending the CP-ORF packet to the first network device. Correspondingly, the policy transmission apparatus further includes a fourth obtaining module, configured to obtain the filtering information from the second network device, where the filtering information is carried in the covering prefixes outbound route filter CP-ORF packet, and the CP-ORF packet includes an address family identifier field, a subsequent address family identifier field, a virtual private network route target field, a route type field, and a host address field. The policy address family identifier is carried in the address family identifier field and the subsequent address family identifier field, the device identifier of the second network device is carried in the virtual private network route target field, the refined filtering information is carried in the host address field, and the route type field is used to indicate the type included in the refined filtering information. For example, different values of the route type field may correspond to different combination schemes of the refined filtering information, and any one or a combination of the distinguisher, the policy color, and the endpoint corresponds to a different value of the route type field.

The foregoing case is described by using an example in which the second network device sends the filtering information to the first network device, so that the first network device obtains the filtering information. The first network device may alternatively obtain the filtering information in another manner. For example, the policy transmission apparatus further includes a fifth obtaining module, configured to obtain the filtering information from a controller. Optionally, the filtering information is carried in a border gateway protocol BGP packet. In this case, the controller may send the filtering information to the first network device by sending the BGP packet to the first network device.

It can be learned that in this application, the second network device (or the controller) may send the filtering information to the first network device, so that the second network device used as the receive end (for example, a client) does not need to receive a policy unrelated to the second network device, so that running efficiency of the network device is improved. In addition, because the first network device may send policy information related to the second network device only to the second network device, network transmission efficiency is also improved.

Optionally, the policy transmission apparatus is used in a route reflector. The policy transmission apparatus may alternatively be used in another network device that needs to resolve a similar problem in another application scenario.

According to a fourth aspect, a policy transmission apparatus is provided. The policy transmission apparatus includes: a first sending module, configured to send filtering information to a first network device, where the filtering information includes a policy address family identifier and a device identifier of the second network device; and a receiving module, configured to receive a policy sent by the first network device, where a type of the policy belongs to a type indicated by the policy address family identifier, and the policy includes the device identifier of the second network device.

The first sending module in the second network device can send the filtering information to the first network device, so that the first network device performs filtering in advance based on the filtering information to obtain a policy to be sent to the second network device. Because the second network device needs to receive only a policy related to the second network device, transmission efficiency of a network link is also improved.

Optionally, the filtering information further includes refined filtering information. In this case, the first network device may filter at least one received policy based on the policy address family identifier, the device identifier of the second network device, and the refined filtering information in the filtering information, and send a policy obtained through filtering to the second network device. The policy obtained by the first network device through filtering needs to meet the following conditions: A type of the policy belongs to the type indicated by the policy address family identifier, the policy includes the device identifier of the second network device, and the policy includes the refined filtering information. When filtering the at least one received policy, the first network device may first perform preliminary filtering based on the policy address family identifier and the device identifier of the second network device to obtain some policies, and then filter these policies based on the refined filtering information.

Optionally, a type of the refined filtering information includes at least one of a distinguisher, a policy color, and an endpoint.

Optionally, in a first manner of sending the filtering information to the first network device, the filtering information is carried in an ORF packet. The ORF packet includes an address family identifier field, a subsequent address family identifier field, and an ORF entry field. Correspondingly, the policy address family identifier is carried in the address family identifier field and the subsequent address family identifier field, and the device identifier of the second network device is carried in the ORF entry field.

Optionally, the ORF packet may further include an ORF type field, and the ORF type field indicates that the ORF packet carries indication information and is used for policy filtering.

Optionally, in a second manner in which the second network device sends the filtering information to the first network device, the filtering information is carried in a CP-ORF packet. The CP-ORF packet includes an address family identifier field, a subsequent address family identifier field, and a virtual private network route target field. Correspondingly, the policy address family identifier is carried in the address family identifier field and the subsequent address family identifier field, and the device identifier of the second network device is carried in the virtual private network route target field.

Optionally, in a third manner in which the second network device sends the filtering information to the first network device, the filtering information is carried in a CP-ORF packet. The CP-ORF packet includes an address family identifier field, a subsequent address family identifier field, a virtual private network route target field, a route type field, and a host address field. The policy address family identifier is carried in the address family identifier field and the subsequent address family identifier field, the device identifier of the second network device is carried in the virtual private network route target field, the refined filtering information is carried in the host address field, and the route type field is used to indicate the type included in the refined filtering information.

Optionally, the policy transmission apparatus further includes: a second sending module, configured to send an address of the second network device to the first network device, where the address of the second network device corresponds to the device identifier of the second network device.

According to a fifth aspect, a network device is provided. The network device includes a processor and a memory. The memory stores a program. The processor is configured to invoke the program stored in the memory, to enable the network device to perform the policy transmission method according to any one of the designs of the first aspect.

According to a sixth aspect, a network device is provided. The network device includes a processor and a memory. The memory stores a program. The processor is configured to invoke the program stored in the memory, to enable the network device to perform the policy transmission method according to any one of the designs of the second aspect.

According to a seventh aspect, a network device is provided. The network device includes a processor. The processor is coupled to a memory, to invoke a computer program stored in the memory, to perform the policy transmission method according to any one of the designs of the first aspect.

According to an eighth aspect, a network device is provided. The network device includes a processor. The processor is coupled to a memory, to invoke a computer program stored in the memory, to perform the policy transmission method according to any one of the designs of the second aspect.

According to a ninth aspect, a computer storage medium is provided. The computer storage medium stores a computer program. The computer program is configured to perform the policy transmission method according to any one of the designs of the first aspect.

According to a tenth aspect, a computer storage medium is provided. The computer storage medium stores a computer program. The computer program is configured to perform the policy transmission method according to any one of the designs of the first aspect.

According to an eleventh aspect, a computer program product including instructions is provided. When the computer program product is run on a network device, the network device is enabled to perform the policy transmission method according to any one of the designs of the first aspect.

According to a twelfth aspect, a computer program product including instructions is provided. When the computer program product is run on a network device, the network device is enabled to perform the policy transmission method according to any one of the designs of the second aspect.

According to a thirteenth aspect, a network transmission system is provided. The network transmission system includes a first network device and a second network device. The first network device is configured to: receive at least one policy; and send one or more policies in the at least one policy to the second network device based on filtering information, where the filtering information includes a policy address family identifier and a device identifier of the second network device, a type of the one or more policies belongs to a type indicated by the policy address family identifier, and the one or more policies include the device identifier of the second network device. The second network device is configured to receive the policy sent by the first network device.

Optionally, the first network device is configured to: obtain an address of the second network device, where the address of the second network device corresponds to the device identifier of the second network device; and send the one or more policies to the second network device based on the address of the second network device and the filtering information.

Optionally, the second network device is further configured to send the address of the second network device to the first network device.

Optionally, the filtering information further includes refined filtering information. In this case, the first network device may filter the at least one received policy based on the policy address family identifier, the device identifier of the second network device, and the refined filtering information in the filtering information, and send a policy obtained through filtering to the second network device. The policy obtained by the first network device through filtering needs to meet the following conditions: A type of the policy belongs to the type indicated by the policy address family identifier, the policy includes the device identifier of the second network device, and the policy includes the refined filtering information. When filtering the at least one received policy, the first network device may first perform preliminary filtering based on the policy address family identifier and the device identifier of the second network device to obtain some policies, and then filter these policies based on the refined filtering information.

Optionally, a type of the refined filtering information includes at least one of a distinguisher, a policy color, and an endpoint, where the identifier, the policy color, and the endpoint are attributes that can be carried in the policy.

Optionally, the second network device is configured to send the filtering information to the first network device. In this case, the filtering information is obtained by the first network device from the second network device.

Optionally, when the filtering information is obtained by the first network device from the second network device, the filtering information is carried in an outbound route filter ORF packet. The ORF packet includes an address family identifier field, a subsequent address family identifier field, and an ORF entry field. The policy address family identifier is carried in the address family identifier field and the subsequent address family identifier field, and the device identifier of the second network device is carried in the ORF entry field.

Optionally, the ORF packet may further include an ORF type field, and the ORF type field indicates that the ORF packet carries the filtering information and is used for policy filtering.

Optionally, when the filtering information is obtained by the first network device from the second network device, the filtering information is carried in a covering prefixes outbound route filter CP-ORF packet, and the CP-ORF packet includes an address family identifier field, a subsequent address family identifier field, and a virtual private network route target field. The policy address family identifier is carried in the address family identifier field and the subsequent address family identifier field, and the device identifier of the second network device is carried in the virtual private network route target field.

Optionally, when the filtering information is obtained by the first network device from the second network device, the filtering information is carried in a covering prefixes outbound route filter CP-ORF packet. The CP-ORF packet includes an address family identifier field, a subsequent address family identifier field, a virtual private network route target field, a route type field, and a host address field. The policy address family identifier is carried in the address family identifier field and the subsequent address family identifier field, and the device identifier of the second network device is carried in the virtual private network route target field. When the filtering information includes the refined filtering information, the refined filtering information is carried in the host address field, and the route type field is used to indicate the type included in the refined filtering information. For example, different values of the route type field may correspond to different combination schemes of the refined filtering information, and any one or a combination of the distinguisher, the policy color, and the endpoint corresponds to a different value of the route type field.

Optionally, the foregoing case is described by using an example in which the second network device sends the filtering information to the first network device, so that the first network device obtains the filtering information. In another case, the first network device may alternatively obtain the filtering information in another manner. For example, the network transmission system further includes a controller, and the controller is configured to send the filtering information to the first network device. In this case, the filtering information is obtained by the first network device from the controller. Optionally, the filtering information is carried in a BGP packet.

Optionally, the first network device in this application is a route reflector.

For technical effects achieved by any design of the fifth aspect to the thirteenth aspect, refer to technical effects achieved by corresponding designs of the first aspect and the second aspect. Details are not described herein again.

DETAILED DESCRIPTION OF ILLUSTRATIVE EMBODIMENTS

To make principles and technical solutions of this application clearer, the following further describes implementations of this application in detail with reference to the accompanying drawings.

Embodiments of this application provide a policy transmission method and apparatus, and a network transmission system. It should be noted that a policy in this application may be a policy of any type, for example, an SR policy, a FlowSpec, or RPD. The SR policy may be an SR policy of any type, for example, an IPV4 SR policy or an IPV6 SR policy. In the following embodiments, the SR policy is used as an example to describe the policy transmission method and apparatus, and the network transmission system that are provided in embodiments of this application. For a transmission method and apparatus, and a network transmission system for a policy of another type (for example, the FlowSpec or the RPD), refer to an SR policy transmission method and apparatus, and a network transmission system. This is not limited in embodiments of this application.

Figure 1:
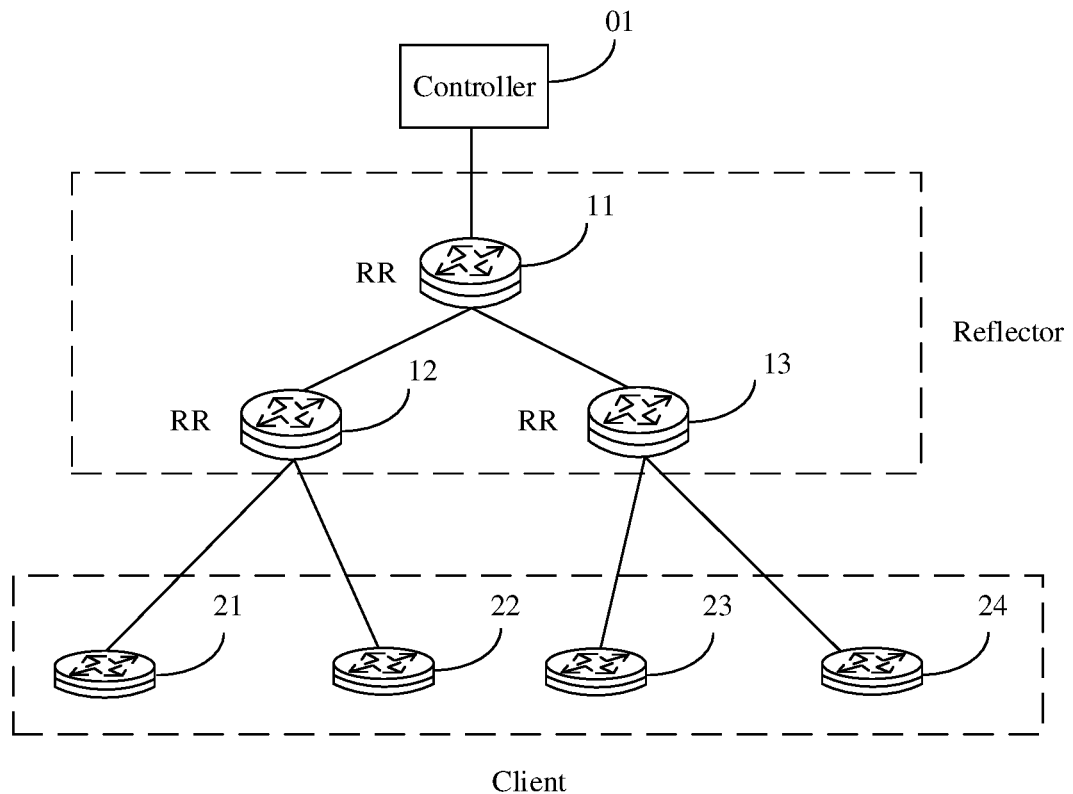
FIG. 1 is a schematic diagram of a structure of a network transmission system according to an embodiment of this application.

The policy transmission method provided in this application may be applied to a network transmission system, and the network transmission system includes a controller and a plurality of network devices. For example, FIG. 1 is a schematic diagram of a structure of a network transmission system according to an embodiment of this application. As shown in FIG. 1, the network transmission system includes a controller 01 and a plurality of network devices. The plurality of network devices in the network transmission system may be classified into two types: route reflectors (RRs) 11, 12, and 13 (where the route reflector 11 may be referred to as a level-1 route reflector, and the route reflectors 12 and 13 may be referred to as level-2 route reflectors) and clients 21, 22, 23, and 24 in FIG. 1. In FIG. 1, for example, a quantity of the plurality of network devices is 7. During actual application, a quantity of network devices in the network transmission system may be determined based on a requirement.

Connections may be established between the controller 01 and some of the plurality of network devices (for example, the route reflector 11 in FIG. 1) based on the BGP, or connections may be established between the plurality of network devices based on the BGP. In addition, in the plurality of network devices, two network devices at two ends of a BGP protocol-based connection are neighbor network devices of each other (where for example, the route reflector 12 and the client 21 are neighbor network devices of each other, and the route reflector 12 and the client 22 are also neighbor network devices of each other).

In a possible case, the controller can directly send an SR policy (where the SR policy may also be referred to as SR policy-based routing) to each client. In another possible case, the controller may send an SR policy to a client via a neighbor network device (for example, a route reflector or another client) of the client. The network structure shown in FIG. 1 is used as an example. Herein, an example in which the controller 01 sends an SR policy to the client 21 via the route reflector 12 is used for description. The route reflector 12 is configured to forward the SR policy that is sent by the controller 01 to the client 21. In this scenario, the route reflector 12 is further configured to forward an SR policy that is sent to the client 22. Because the route reflector 12 sends, through reflection, an SR policy to a client that establishes a neighbor relationship with the route reflector 12, the client 21 not only can receive an SR policy that is related to the client and forwarded by the route reflector 12, but also can receive an SR policy that is related to the client 22 and forwarded by the route reflector 12. Consequently, the client 21 receives some SR policies that are useless for the client 21.

When a large quantity of clients are connected to the route reflector, each client connected to the SR policy reflector receives a large quantity of useless SR policies. Consequently, network transmission load is increased, load of processing the SR policies by the clients is increased, and overall efficiency of the network transmission system is reduced.

The foregoing process is described by using an example in which a client receives an SR policy from a neighbor route reflector. Actually, a similar problem may also exist between other network devices that have a neighbor relationship. For example, the level-2 route reflector 12 or 13 shown in FIG. 1 also receives a large quantity of useless SR policies sent by the level-1 route reflector 11.

Embodiments of this application provide a policy transmission method. In this method, filtering information is set on a network device sending an SR policy, so that an SR policy related to a receiving network device is obtained by performing filtering in advance on the network device, to reduce useless routing policies (routing policies unrelated to the receiving network device) transmitted in a network transmission system, and reduce load of the network transmission system. In addition, the policy transmission method provided in this application is simple. Therefore, an SR policy transmission process is simplified.

The policy transmission method provided in this application relates to a first network device and a second network device in the network transmission system. The first network device and the second network device may be any two network devices in the network transmission system, and there is an SR policy sending and receiving relationship between the two network devices. For example, for the network transmission system shown in FIG. 1, the first network device and the second network device may be neighbor network devices of each other, and the first network device is configured to send an SR policy to the second network device. In one case, the first network device may be the route reflector 12 in FIG. 1, and the second network device is the client 21 in FIG. 1. In another case, the first network device may be the route reflector 11 in FIG. 1, and the second network device is the route reflector 12 or 13 in FIG. 1. The SR policy sent by the first network device to the second network device may carry a device identifier of a destination network device. For the network structure shown in FIG. 1, the device identifier of the destination network device may be a router identifier (router ID).

The SR policy uses a traffic steering technology based on an SR technology. A network device that has an SR policy planning capability, for example, a controller, deploys a tunnel that meets a service requirement, a service quality requirement, or the like, and notifies a corresponding network device of tunnel information by using a BGP packet. The packet for sending the tunnel information may be referred to as an SR policy, or may be referred to as SR policy-based routing. In some possible cases, the SR policy may be sent by another device that is not the controller in the network and that has an SR policy deployment or generation capability. After the SR policy is sent by, for example, the controller, the SR policy may be received or forwarded by another network device. The SR policy includes information such as a headend, a color, and an endpoint. The headend identifies a location of a device that generates or implements the SR policy. The color is used to distinguish a plurality of SR policies between one headend-endpoint pair. The endpoint indicates a location of a device at the end of the SR policy, and may be an IPV4 or IPv6 address.

The first network device includes a processor. The processor is coupled to a memory, and performs, according to instructions, the method performed by the first network device described in embodiments of this application after reading the instructions in the memory. The second network device also includes a processor. The processor is coupled to a memory, and performs, according to instructions, the method performed by the second network device described in embodiments of this application after reading the instructions in the memory.

Figure 2:
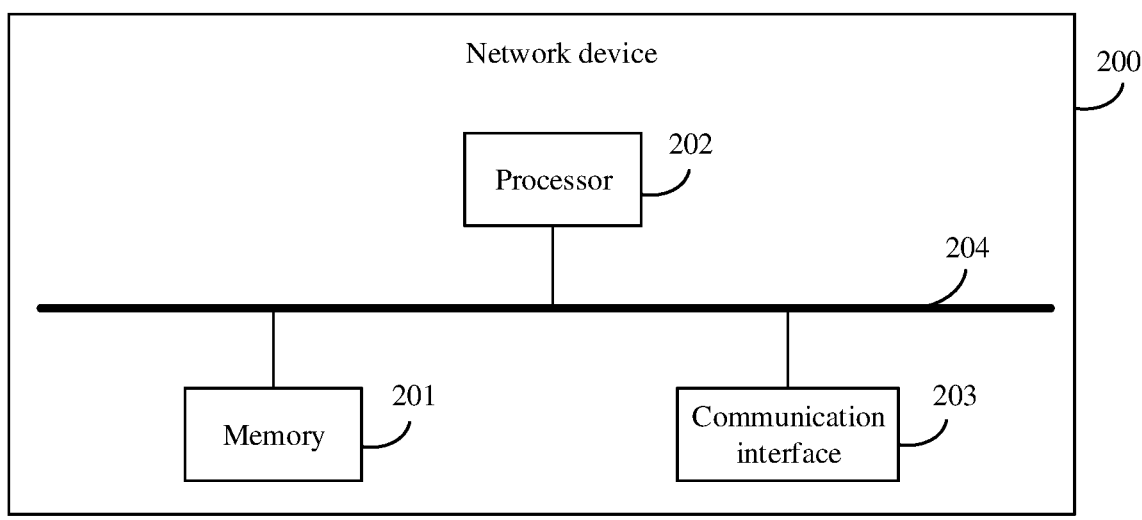
FIG. 2 is a schematic diagram of a structure of a network device according to an embodiment of this application.

In each of the first network device and the second network device, there may be a plurality of processors, and a memory coupled to the processor may be independent of the processor or the network device, or may be inside the processor or the network device. The memory may be a physically independent unit, or may be storage space, a web disk, or the like on a cloud server. Optionally, there may be one or more memories. When there are a plurality of memories, the plurality of memories may be located at a same location or different locations, and may be used independently or in cooperation. For example, when the memory is located inside the network device, refer to FIG. 2. FIG. 2 is a schematic diagram of a structure of a network device according to an embodiment of this application. The network device 200 includes a processor 202 and a memory 201. The memory 201 is configured to store a program, and the processor 202 is configured to invoke the program stored in the memory 201, to enable the network device to perform a corresponding method or function. Optionally, as shown in FIG. 2, the network device 200 may further include at least one communication interface 203 and at least one communication bus 204. The memory 201, the processor 202, and the communication interface 203 are connected through the communication bus 204. The communication interface 203 is configured to communicate with another apparatus under control of the processor 202, and the processor 202 may invoke, through the communication bus 204, the program stored in the memory 201.

Figure 3:
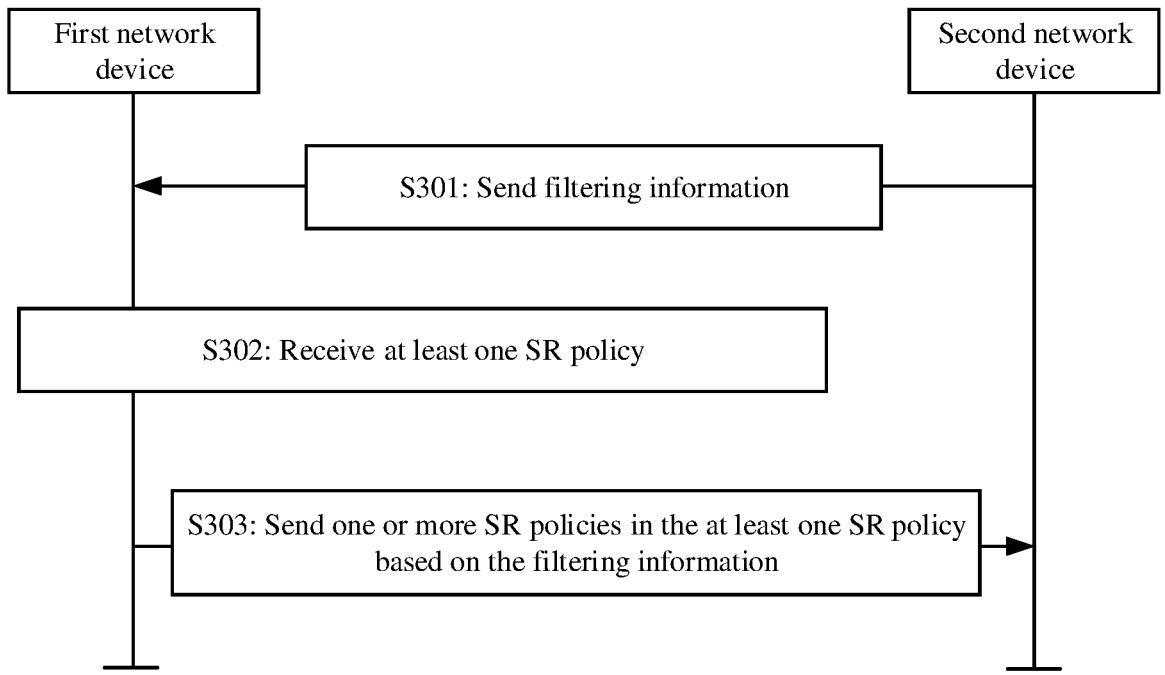
FIG. 3 is a flowchart of a policy transmission method according to an embodiment of this application.

FIG. 3 is a flowchart of a policy transmission method according to an embodiment of this application. As shown in FIG. 3, the policy transmission method may include the following steps.

S301: A second network device sends filtering information to a first network device.

In S301, the second network device needs to send the filtering information to the first network device, so that the first network device obtains the filtering information, and the first network device can transmit an SR policy based on the filtering information in a subsequent operation.

In a first example, the filtering information includes an SR policy address family identifier and a device identifier of the second network device. An SR policy type indicated by the SR policy address family identifier may include an SR policy of any type, for example, an internet protocol version 4 (IPV4) SR policy or an internet protocol version 6 (IPv6) SR policy. The device identifier of the second network device may be a router ID of the second network device, or an identifier of another type, for example, an identification (ID) of the second network device. The SR policy address family identifier and the device identifier of the second network device are used to indicate the first network device to obtain, by filtering the received SR policy, an SR policy that needs to be sent to the second network device.

In a second example, the filtering information includes not only the SR policy address family identifier and the device identifier of the second network device, but also refined filtering information. Optionally, a type of the refined filtering information may include various attributes supported by the SR policy, for example, one or any combination of a distinguisher, a policy color, and an endpoint.

For example, the first network device may be the route reflector 12 in FIG. 1, and the second network device is the client 21 in FIG. 1. In S301, the client 21 may send the filtering information to the route reflector 12. For another example, the first network device may alternatively be the level-1 route reflector 11, and the second network device is the level-2 route reflector 12. In S301, the level-2 route reflector 12 may send the filtering information to the route reflector 11. In another possible case, the first network device and the second network device may even be two network devices that do not directly establish a neighbor relationship. For example, the first network device is the level-1 route reflector 11, and the second network device is the client 21.

S302: The first network device receives at least one SR policy.

The first network device can receive various types of routes (including the SR policy). The route received by the first network device may be, for example, a route directly sent by a controller in a network transmission system to the first network device, may be a route forwarded by the controller to the first network device via another network device, may be a route sent by another network device used as a source device without using the controller in another network application scenario, or may be a route configured by an employee on the first network device. A type of the route received by the first network device may include an SR policy supporting SR, or may include a route supporting another protocol or policy. If receiving the SR policy, the first network device may perform processing according to S303. In this embodiment of this application, that the first network device receives the at least one SR policy is used as an example. A destination network device of the SR policy received by the first network device may be the second network device, or may be another network device.

The scenario shown in FIG. 1 is still used as an example. The route reflector 12 or 13 may receive an SR policy sent by the controller 01, where the SR policy may include a router identifier (router ID) of a destination network device to which the SR policy is to be sent. It is assumed that a router identifier of the client 21 is 1.1.1.1, a router identifier of the client 22 is 2.2.2.2, a router identifier of the client 23 is 3.3.3.3, and a router identifier of the client 24 is 4.4.4.4. If the router identifier included in the SR policy is 1.1.1.1, the SR policy is to be sent to the client 21; if the router identifier included in the SR policy is 2.2.2.2, the SR policy is to be sent to the client 22; if the router identifier included in the SR policy is 3.3.3.3, the SR policy is to be sent to the client 23; or if the router identifier included in the SR policy is 4.4.4.4, the SR policy is to be sent to the client 24.

S303: The first network device sends one or more SR policies in the at least one SR policy to the second network device based on the filtering information.

Before S303, the first network device not only obtains the filtering information, but also receives the at least one SR policy. Therefore, in S303, the first network device may filter the at least one SR policy based on the filtering information, to obtain, through filtering, the one or more SR policies that are in the at least one SR policy and that are to be sent to the second network device. In another case, no SR policy that needs to be sent to the second network device may be obtained based on the filtering information, that is, none of SR policies currently received by the first network device meets a requirement of the second network device.

In the first example, the filtering information includes the SR policy address family identifier and the device identifier of the second network device. An SR policy sent by the controller (or another network device having an SR policy planning or generation capability) carries type information of the SR policy (used to indicate a type of the SR policy, where for example, the type information includes an address family identifier of the SR policy), and a device identifier of a network device to which the SR policy is to be sent (where for example, the device identifier may be carried in an extended community attribute in the SR policy). After filtering the received SR policy, the first network device may obtain the SR policy to be sent to the second network device. A type of the SR policy belongs to a type indicated by the SR policy address family identifier in the filtering information. For example, both the type of the SR policy and the type indicated by the SR policy address family identifier are IPV6 SR policies. A device identifier that is carried in the SR policy and that is of a destination network device to which the SR policy is to be sent is the same as the device identifier of the second network device.

When filtering the received SR policy, for example, the first network device may first detect whether the type of the SR policy belongs to the type indicated by the SR policy address family identifier carried in the previously received filtering information. When the type of the SR policy belongs to the type indicated by the SR policy address family identifier carried in the filtering information, the first network device may further detect whether the device identifier of the destination network device carried in the SR policy is the same as the device identifier of the second network device. When the device identifier that is carried in the SR policy and that is of the network device to which the SR policy should be sent is the same as the device identifier of the second network device, the first network device determines that the SR policy is an SR policy to be sent to the second network device, and the type of the SR policy belongs to a type specified in the filtering information (namely, the type indicated by the SR policy address family identifier), for example, an IPV6 SR policy. When the type of the SR policy does not belong to the type indicated by the SR policy address family identifier carried in the filtering information, or the device identifier of the destination network device carried in the SR policy is different from the device identifier of the second network device, the first network device may determine that the SR policy is not an SR policy that needs to be sent to the second network device.

In a possible example, it is assumed that the at least one SR policy received by the first network device (for example, the route reflector 12 in FIG. 1) is shown in Table 1, and in the filtering information corresponding to the second network device (for example, the client 21 in FIG. 1), the SR policy type indicated by the SR policy address family identifier is an IPV6 SR policy, and the device identifier of the second network device is 1.1.1.1. After filtering received SR policies 1, 2, 3, and 4, the first network device may determine that the SR policy that needs to be sent to the second network device is the SR policy 2 in Table 1. Table 1 is merely used as a possible example. During actual application, the first network device may actually receive and maintain any quantity of SR policies. It should be noted that, in addition to the SR policy, the first network device may further receive a route (including a policy) that supports another protocol type. When the first network device receives a route of another protocol type (for example, an IP route), the first network device does not use the filtering information to filter a route of a non-SR policy type, to ensure normal running of a network system.

TABLE 1

| SR Policy | Type | Device identifier of the network device to which the SR policy is to be sent |
|---|---|---|
| 1 | IPv4 SR Policy | 1.1.1.1 |
| 2 | IPv6 SR Policy | 1.1.1.1 |
| 3 | IPv6 SR Policy | 2.2.2.2 |
| 4 | IPv6 SR Policy | 3.3.3.3 |

The SR policy address family identifier in the filtering information may be used to indicate one or more SR policy types. When detecting whether the type of the received SR policy belongs to the type indicated by the SR policy address family identifier, the first network device may detect whether the type of the received SR policy belongs to some or all of the types indicated by the SR policy address family identifier, that is, may be allowed to perform full matching or partial matching on the received SR policy by using one or more address family identifiers in the filtering information. In the foregoing embodiment, an example in which the first network device detects the type of the received SR policy through full matching is used. Optionally, when the filtering information obtained by the first network device includes a plurality of address family identifiers, for example, includes both an IPV4 policy address family and an IPV6 SR policy address family, the first network device may be allowed to use a partial matching rule to filter the SR policy that needs to be sent to the second network device, for example, as long as the SR policy matches any IPV4 or IPv6 address family type. Alternatively, in another possible case, the filtering information may be allowed to include only one of the device identifier or the SR policy address family identifier. For example, when the filtering information includes only the device identifier of the second network device, the first network device may obtain through filtering SR policies that are of all address family types and that are to be sent to the second network device. When the filtering information includes, for example, only an IPV4 address family type, the first network device may obtain through filtering all IPV4 SR policies, and send the IPV4 SR policies to one or more related network devices based on a connection relationship. In this case, because the filtering information does not include the device identifier of the second network device, the first network device does not send the SR policies only to the specific second network device, unless the second network device is a unique network device determined by the first network device based on the connection relationship. This is not uniquely limited in this embodiment of this application.

In the second example, the filtering information includes not only the SR policy address family identifier and the device identifier of the second network device, but also the refined filtering information. An SR policy sent by the controller may carry not only type information used to indicate an SR policy type and a device identifier of a network device (for example, a destination network device) to which the SR policy needs to be sent, but also related information that can match the refined filtering information. The matching may be, for example, that the related information carried in the SR policy is completely the same as the refined filtering information, or may be that the related information carried in the SR policy can match the refined filtering information according to a preset rule. In this case, in S303, the first network device may filter the at least one received SR policy based on the SR policy address family identifier, the device identifier of the second network device, and the refined filtering information in the filtering information. For an SR policy that is obtained through filtering by the first network device and that is to be sent to the second network device, a type of the SR policy belongs to the type indicated by the SR policy address family identifier in the filtering information, a device identifier that is carried in the SR policy and that is of a network device to which the SR policy needs to be sent is the same as the device identifier of the second network device, and the SR policy carries information that can match the refined filtering information in the filtering information.

When the first network device filters the received SR policy, the first network device may first detect whether the type of the SR policy belongs to the type indicated by the SR policy address family identifier in the filtering information. When the type of the SR policy belongs to the type indicated by the SR policy address family identifier in the filtering information, the first network device may further detect whether the device identifier that is carried in the SR policy and that is of the network device (for example, the destination network device) to which the SR policy should be sent to is the same as the device identifier of the second network device. When the device identifier that is carried in the SR policy and that is of the network device to which the SR policy should be sent is the same as the device identifier of the second network device, the first network device may determine whether the SR policy carries the information that can match the refined filtering information in the filtering information. When the related information carried in the SR policy matches the refined filtering information in the filtering information, the first network device may determine that the SR policy is an SR policy that needs to be sent to the second network device. When the type of the SR policy does not belong to the type indicated by the SR policy address family identifier in the filtering information, or the device identifier that is carried in the SR policy and that is of the network device to which the SR policy needs to be sent is different from the device identifier of the second network device, or the related information carried in the SR policy cannot match the refined filtering information in the filtering information, the first network device may determine that the SR policy is not an SR policy to be sent to the second network device.

In a possible example, it is assumed that the at least one SR policy received by the first network device (for example, the route reflector 12 in FIG. 1) is shown in Table 2, and in the filtering information of the second network device (for example, the client 21 in FIG. 1), the SR policy type indicated by the SR policy address family identifier is an IPV6 SR policy, the device identifier of the second network device is 1.1.1.1, and the refined filtering information is X3. After filtering SR policies 1, 2, 3, 4, and 5, the first network device may obtain that the SR policy to be sent to the second network device is the SR policy 5 in Table 2.

TABLE 2

| SR Policy | Type | Device identifier of the network device to which the SR policy is to be sent | Refined filtering information |
|---|---|---|---|
| 1 | IPv4 SR Policy | 1.1.1.1 | $X_1$ |
| 2 | IPv6 SR Policy | 1.1.1.1 | $X_2$ |
| 3 | IPv6 SR Policy | 2.2.2.2 | $X_3$ |
| 4 | IPv6 SR Policy | 3.3.3.3 | $X_4$ |
| 5 | IPv6 SR Policy | 1.1.1.1 | $X_3$ |

When filtering the at least one received SR policy based on the filtering information, the first network device may obtain through filtering an SR policy to be sent to the second network device, or may not obtain through filtering the SR policy to be sent to the second network device.

When the first network device obtains through filtering the one or more SR policies to be sent to the second network device from the at least one received SR policy, the first network device may send the one or more SR policies to the second network device. If the at least one SR policy received by the first network device further includes other SR policies than the one or more SR policies, the first network device does not send these SR policies to the second network device. In a possible case, the first network device may further discard these SR policies, to reduce storage pressure of the first network device. In this way, a routing policy (which may be referred to as a useless routing policy) that does not need to be sent to the second network device is prevented from being sent to the second network device, so that a quantity of useless routing policies transmitted in the network transmission system is reduced, load of the network transmission system is reduced, and load of the second network device is also prevented from being increased due to reception of excessive useless routing policies.

When the first network device does not obtain through filtering the SR policy to be sent to the second network device from the at least one received SR policy, the first network device does not send the received SR policy to the second network device. In a possible case, the first network device may further discard these SR policies.

In a possible example, it is assumed that the at least one SR policy received by the first network device (for example, the route reflector 12 in FIG. 1) is shown in Table 1, and the SR policy obtained through filtering by the first network device from the received SR policies 1, 2, 3, and 4 is the SR policy 2. In this case, the first network device may send the SR policy 2 to the second network device (for example, the client 21 in FIG. 1), and the first network device may further discard the SR policies 1, 2, and 3. For example, the discarding operation may occur after preset time has elapsed.

In a possible example, it is assumed that the at least one SR policy received by the first network device (for example, the route reflector 12 in FIG. 1) is shown in Table 2, and the SR policy obtained through filtering by the first network device from the received SR policies 1, 2, 3, 4, and 5 is the SR policy 5. In this case, the first network device may send the SR policy 5 to the second network device (for example, the client 21 in FIG. 1), and the first network device may further discard the SR policies 1, 2, 3, and 4. For example, the discarding operation may occur after preset time has elapsed.

In addition, when sending the SR policy to the second network device, the first network device may send the SR policy to the second network device based on an address of the second network device. The address of the second network device corresponds to the device identifier of the second network device. The address of the second network device may be any address of the second network device, for example, an internet protocol (IP) address or a media access control (MAC) address. Before S303, the first network device needs to obtain the address of the second network device. For example, the second network device may separately send a message to the first network device to notify the address of the second network device, and the message includes the correspondence between the address of the second network device and the device identifier of the second network device, or the message includes at least indication information that can enable the first network device to establish the correspondence between the address of the second network device and the device identifier of the second network device. Alternatively, the address of the second network device may be manually configured on the first network device, and the first network device is enabled to establish the correspondence between the address of the second network device and the device identifier of the second network device. Alternatively, when the second network device sends the filtering information to the first network device, the first network device can directly establish the correspondence between the address of the second network device and the device identifier of the second network device based on a source internet protocol (IP) address for sending the filtering information.

In S301, the second network device may send the filtering information to the first network device in a plurality of manners. This embodiment of this application provides at least the following three manners.

(1) In a first manner in which the second network device sends the filtering information to the first network device, the filtering information is carried in an outbound route filter (ORF) packet, and the second network device may send the filtering information to the first network device by sending the ORF packet to the first network device.

For example, the ORF packet includes at least an address family identifier field, a subsequent address family identifier field, and an ORF entry field.

The SR policy address family identifier is carried in the address family identifier field and the subsequent address family identifier field. For example, a part of information of the SR policy address family identifier is carried in the address family identifier field, and the other part of information is carried in the subsequent address family identifier field. For example, when the SR policy type indicated by the SR policy address family identifier is an IPV4 SR policy, the part of information may include IPv4, and the other part of information may include the SR policy. When the SR policy type indicated by the SR policy address family identifier is an IPV6 SR policy, the part of information may include IPV6, and the other part of information may include the SR policy. The device identifier of the second network device is carried in the ORF entry field.

Optionally, the ORF packet may further include an ORF type field, and the ORF type field indicates that the ORF packet carries the filtering information and is used for SR policy filtering. For example, the ORF type field may indicate, by assigning a value, that the ORF packet carries the filtering information and is used for SR policy filtering.

Figure 4:
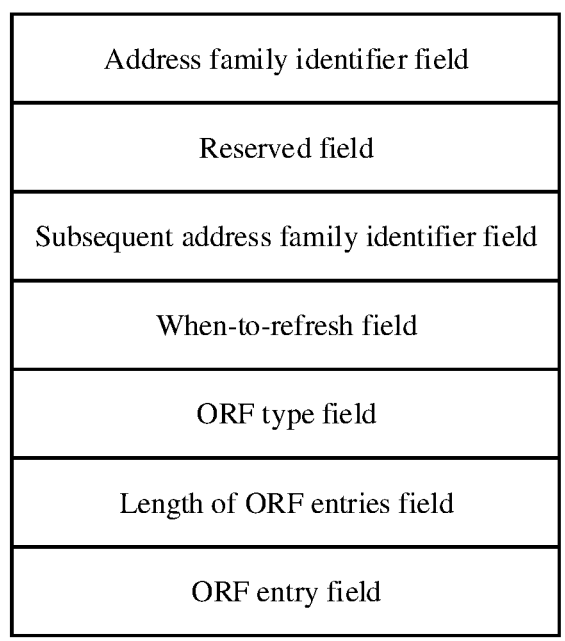
FIG. 4 is a schematic diagram of a structure of an ORF packet according to an embodiment of this application.

FIG. 4 is a schematic diagram of a structure of an ORF packet according to an embodiment of this application. As shown in FIG. 4, the ORF packet may include not only an address family identifier field, a subsequent address family identifier field, an ORF entry field, and an ORF type field, but also a reserved field, a when-to-refresh field, a length of ORF entries field, and the like. The address family identifier field, the reserved field, the subsequent address family identifier field, the when-to-refresh field, the ORF type field, the length of ORF entries field, and the ORF entry field may be sequentially arranged. Optionally, the address family identifier field includes 2 bytes, the subsequent address family identifier field includes 1 byte, the ORF type field includes 1 byte, the ORF entry field includes 4 bytes, the reserved field includes 1 byte, the when-to-refresh field includes 1 byte, and the length of ORF entries field includes 2 bytes.

The foregoing refined filtering information may be carried in at least one field other than the address family identifier field, the subsequent address family identifier field, the ORF entry field, and the ORF type field in the ORF packet.

After receiving the ORF packet sent by the second network device, the first network device needs to parse the ORF packet to obtain the filtering information carried in the ORF packet. For example, the first network device may first detect whether the ORF type field in the ORF packet is used to indicate that the ORF packet is used for SR policy filtering. When the ORF type field is used to indicate that the ORF packet is used for SR policy filtering, the first network device may further obtain the SR policy address family identifier from the address family identifier field and the subsequent address family identifier field in the ORF packet, obtain the device identifier of the second network device from the ORF entry field, and obtain the refined filtering information from the at least one field other than the address family identifier field, the subsequent address family identifier field, the ORF entry field, and the ORF type field.

(2) In a second manner in which the second network device sends the filtering information to the first network device, the filtering information is carried in a covering prefixes outbound route filter (CP-ORF) packet, and the second network device may send the filtering information to the first network device by sending the CP-ORF packet to the first network device.

For example, the CP-ORF packet includes an address family identifier field, a subsequent address family identifier field, and a virtual private network route target (VPN Route Target) field. Similar to the foregoing ORF packet, the SR policy address family identifier may be carried in the address family identifier field and the subsequent address family identifier field. The device identifier of the second network device is carried in the virtual private network route target field.

(3) In a third manner in which the second network device sends the filtering information to the first network device, the filtering information may be carried in a CP-ORF packet, and the second network device may send the filtering information to the first network device by sending the CP-ORF packet to the first network device.

For example, the CP-ORF packet includes an address family identifier field, a subsequent address family identifier field, a virtual private network route target field, a route type field, and a host address field. Similar to the foregoing CP-ORF packet, the SR policy address family identifier may be carried in the address family identifier field and the subsequent address family identifier field. The device identifier of the second network device is carried in the virtual private network route target field. When the filtering information includes the refined filtering information, the refined filtering information is carried in the host address field, and the route type field is used to indicate the type included in the refined filtering information. For example, different values of the route type field may correspond to different combination schemes of the refined filtering information, and any one or a combination of the distinguisher, the policy color, and the endpoint corresponds to a different value of the route type field.

Figure 5:
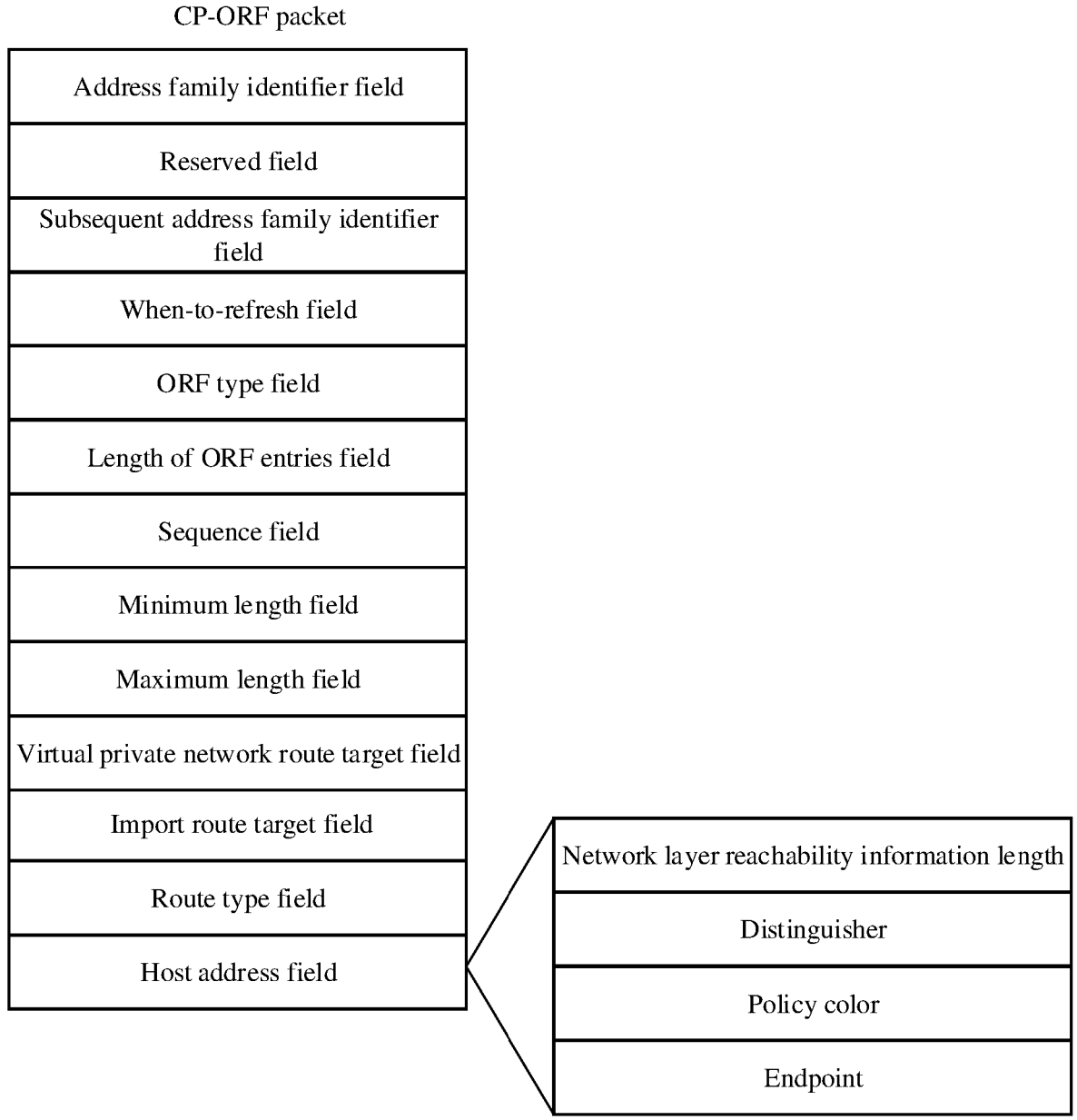
FIG. 5 is a schematic diagram of a structure of a CP-ORF packet according to an embodiment of this application.

FIG. 5 is a schematic diagram of a structure of a CP-ORF packet according to an embodiment of this application. As shown in FIG. 5, the ORF packet may include an address family identifier field, a subsequent address family identifier field, a virtual private network route target field, a reserved field, a when-to-refresh field, an ORF type field (used to indicate that a type of the CP-ORF packet is a CP-ORF type), a length of ORF entries field, a sequence field, a minimum length (Minlen) field, a maximum length (Maxlen) field, an import route target field, a route type field, a host address field, and the like. The address family identifier field, the reserved field, the subsequent address family identifier field, the when-to-refresh field, the ORF type field, the length of ORF entries field, the sequence field, the minimum length field, the maximum length field, the virtual private network route target field, the import route target field, the route type field, and the host address field may be sequentially arranged.

Optionally, the address family identifier field includes 2 bytes, the subsequent address family identifier field includes 1 byte, the ORF type field includes 1 byte, the reserved field includes 1 byte, the when-to-refresh field includes 1 byte, the length of ORF entries field includes 2 bytes, the sequence field includes 4 bytes, the minimum length field includes 1 byte, the maximum length field includes 1 byte, the virtual private network route target field includes 8 bytes, the import route target field includes 8 bytes, and the route type field includes 1 byte. When the SR policy type indicated by the SR policy address family identifier is an IPV4 SR policy, the host address field includes 13 bytes. When the SR policy type indicated by the SR policy address family identifier is an IPV6 SR policy, the host address field includes 25 bytes.

Optionally, still refer to FIG. 5. The host address field may include a network layer reachability information length (NLRI Length), a distinguisher, a policy color, and an endpoint. The network layer reachability information length includes 1 byte, the distinguisher includes 4 bytes, and the policy color includes 4 bytes. When the SR policy type indicated by the SR policy address family identifier is an IPV4 SR policy, the endpoint includes 4 bytes. When the SR policy type indicated by the SR policy address family identifier is an IPV6 SR policy, the endpoint includes 16 bytes.

The foregoing refined filtering information may be carried in at least one field other than the address family identifier field, the subsequent address family identifier field, and the virtual private network route target field in the CP-ORF packet. For example, the CP-ORF packet further includes: The refined filtering information may be carried in the host address field, and the route type field is used to indicate the type included in the refined filtering information. For example, different values of the route type field may correspond to different combination schemes of the refined filtering information, and any one or a combination of the distinguisher, the policy color, and the endpoint corresponds to a different value of the route type field.

For example, a value of the route type field and a type of the refined filtering information indicated by the value of the route type field may be shown in Table 3. It can be learned that different values of the route type field indicate different types of refined filtering information. It should be noted that the value assigned to the route type field in Table 3 is merely a possible example, and another value may be assigned based on a requirement during actual application.

TABLE 3

| Value of the route type field | Type included in the refined filtering information |
|---|---|
| 0 | Distinguisher |
| 1 | Policy color |
| 2 | Endpoint |
| 3 | Distinguisher and policy color |
| 4 | Distinguisher and endpoint |
| 5 | Policy color and endpoint |
| 6 | Distinguisher, policy color, and endpoint |

After receiving the CP-ORF packet sent by the second network device, the first network device needs to parse the CP-ORF packet to obtain the filtering information carried in the CP-ORF packet. For example, the first network device may first obtain the SR policy address family identifier from the address family identifier field and the subsequent address family identifier field in the CP-ORF packet; obtain the device identifier of the second network device from the virtual private network route target field; determine, based on the value of the route type field, the type included in the refined filtering information; and obtain the refined filtering information from the host address field based on the type included in the refined filtering information.

Both the ORF packet and the CP-ORF packet may be included in a BGP route-refresh message or another message (for example, a BGP route update (BGP Update) message). This is not limited in this embodiment of this application.

In the foregoing embodiment, S301 is described by using an example in which the second network device sends the filtering information to the first network device, so that the first network device obtains the filtering information. The first network device may alternatively obtain the filtering information in another manner. For example, the first network device may obtain the filtering information from the controller. Optionally, the filtering information is carried in a BGP packet. In this case, the controller may send the filtering information to the first network device by sending the BGP packet to the first network device. For another example, the first network device may alternatively obtain the filtering information in a static configuration manner instead of obtaining the filtering information based on a packet sent by another device (for example, the second network device or the controller). In this case, the filtering information needs to be manually configured on the first network device, so that the first network device obtains the filtering information.

In conclusion, in the policy transmission method provided in this embodiment of this application, the first network device can send the one or more SR policies in the at least one received SR policy to the second network device based on the filtering information. The type of the one or more SR policies belongs to the type indicated by the SR policy address family identifier, and the one or more SR policies include the device identifier of the second network device. It can be learned that the SR policy sent by the first network device to the second network device is an SR policy to be sent to the second network device, so that the first network device is prevented from sending an SR policy unrelated to the second network device to the second network device, to reduce transmission of useless SR policies in the network transmission system, reduce load of the network transmission system, and improve overall efficiency of the network transmission system.

In the policy transmission method provided in this embodiment of this application, SR policies are filtered for the second network device on the first network device, so that a quantity of SR policies sent by the first network device to the second network device is reduced, and transmission pressure of a network transmission link is reduced. In addition, because a useless SR policy is not obtained through filtering by the first network device, the second network device does not need to process a large quantity of useless SR policies, so that load of the second network device is reduced.

In the policy transmission method provided in this embodiment of this application, after obtaining the filtering information, the first network device may directly filter the received SR policy based on the filtering information. Entire SR policy filtering is simple, and filtering efficiency of the SR policy is high.

The foregoing describes in detail the policy transmission method provided in this application with reference to FIG. 1 to FIG. 5. It may be understood that, to implement the functions described in the foregoing methods, the first network device and the second network device need to include corresponding hardware and/or software modules for performing the functions. This application can be implemented in a form of hardware or a combination of hardware and computer software with reference to the execution processes of the methods described in embodiments disclosed in this specification. Whether a function is performed by hardware or hardware driven by computer software depends on particular applications and design constraints of the technical solutions. A person skilled in the art may use different manners to implement the described functions for each particular application with reference to embodiments, but it should not be considered that the implementation goes beyond the scope of this application.

In embodiments, a corresponding network device may be divided into function modules based on the foregoing method embodiments. For example, function modules may be obtained through division based on corresponding functions, or two or more functions may be integrated into one processing module. The integrated module may be implemented in a form of hardware. It should be noted that, in embodiments, division into the modules is an example, and is merely a possible logical function division. During actual implementation, another division manner may be used.

When the division into function modules is used, policy transmission apparatuses provided in this application are described below with reference to FIG. 6 and FIG. 7.

Figure 6:
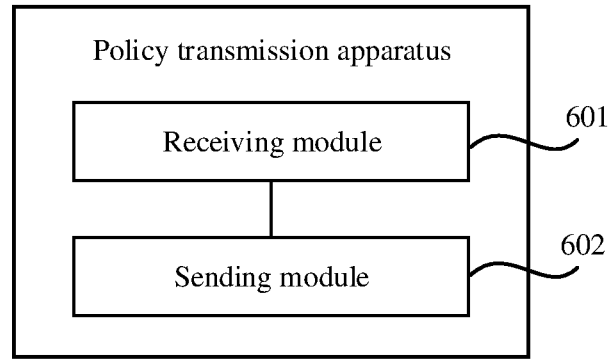
FIG. 6 is a block diagram of a policy transmission apparatus according to an embodiment of this application.

FIG. 6 is a block diagram of a policy transmission apparatus according to an embodiment of this application. The policy transmission apparatus may be, for example, the first network device in the foregoing embodiments. As shown in FIG. 6, the policy transmission apparatus includes a receiving module 601 and a sending module 602.

The receiving module 601 is configured to receive at least one SR policy. For an operation performed by the receiving module 601, refer to S302 in the embodiment shown in FIG. 3.

The sending module 602 is configured to send one or more SR policies in the at least one SR policy to a second network device based on filtering information, where the filtering information includes an SR policy address family identifier and a device identifier of the second network device, a type of the one or more SR policies belongs to a type indicated by the SR policy address family identifier, and the one or more SR policies include the device identifier of the second network device. For an operation performed by the sending module 602, refer to S303 in the embodiment shown in FIG. 3.

In conclusion, in the policy transmission apparatus provided in this embodiment of this application, the sending module can filter the at least one received SR policy based on the filtering information, to obtain an SR policy to be sent to the second network device. The first network device is prevented from sending an SR policy unrelated to the second network device to the second network device, to reduce transmission of useless SR policies in a network transmission system, and reduce load of the network transmission system.

In this application, SR policy filtering is performed on the first network device, so that the first network device can send the SR policy to the second network device. On a transmission path (where the transmission path may be a part of a complete transmission path) including the first network device and the second network device, the first network device may be referred to as a transmit end, and the second network device may be referred to as a receive end. Therefore, it is equivalent to implementing SR policy filtering at the transmit end in this embodiment of this application, so that a quantity of SR policies transmitted on the transmission path is reduced, and pressure of processing the SR policies at the receive end is also reduced.

Optionally, the policy transmission apparatus further includes: a first obtaining module (not shown in FIG. 6), configured to obtain an address of the second network device, where the address of the second network device corresponds to the device identifier of the second network device; and the sending module 602 is configured to send the one or more SR policies to the second network device based on the address of the second network device and the filtering information.

Optionally, the filtering information further includes refined filtering information. For an SR policy that is obtained through filtering by the first network device and that is to be sent to the second network device, a type of the SR policy belongs to the type indicated by the SR policy address family identifier, a device identifier that is carried in the SR policy and that is of a network device to which the SR policy is to be sent is the same as the device identifier of the second network device, and refined filtering information carried in the SR policy matches the refined filtering information in the filtering information.

Optionally, a type of the refined filtering information includes at least one of a distinguisher, a policy color, and an endpoint.

Optionally, in a first manner in which the second network device sends the filtering information to the first network device, the filtering information is carried in an ORF packet, and the second network device may send the filtering information to the first network device by sending the ORF packet to the first network device. Correspondingly, the policy transmission apparatus further includes a second obtaining module (not shown in FIG. 6), configured to obtain the filtering information from the second network device. The filtering information is carried in an outbound route filter ORF packet. The ORF packet includes an address family identifier field, a subsequent address family identifier field, and an ORF entry field. The SR policy address family identifier is carried in the address family identifier field and the subsequent address family identifier field, and the device identifier of the second network device is carried in the ORF entry field.

Optionally, the ORF packet may further include an ORF type field, and the ORF type field indicates that the ORF packet carries the filtering information and is used for SR policy filtering.

Optionally, in a second manner in which the second network device sends the filtering information to the first network device, the filtering information is carried in a CP-ORF packet, and the second network device may send the filtering information to the first network device by sending the CP-ORF packet to the first network device. Correspondingly, the policy transmission apparatus further includes a third obtaining module (not shown in FIG. 6), configured to obtain the filtering information from the second network device. The filtering information is carried in a covering prefixes outbound route filter CP-ORF packet. The CP-ORF packet includes an address family identifier field, a subsequent address family identifier field, and a virtual private network route target field. The SR policy address family identifier is carried in the address family identifier field and the subsequent address family identifier field, and the device identifier of the second network device is carried in the virtual private network route target field.

Optionally, in a second manner in which the second network device sends the filtering information to the first network device, the filtering information is carried in a CP-ORF packet, and the second network device may send the filtering information to the first network device by sending the CP-ORF packet to the first network device. Correspondingly, the policy transmission apparatus further includes a fourth obtaining module (not shown in FIG. 6), configured to obtain the filtering information from the second network device, where the filtering information is carried in the covering prefixes outbound route filter CP-ORF packet, and the CP-ORF packet includes an address family identifier field, a subsequent address family identifier field, a virtual private network route target field, a route type field, and a host address field. The SR policy address family identifier is carried in the address family identifier field and the subsequent address family identifier field, the device identifier of the second network device is carried in the virtual private network route target field, the refined filtering information is carried in the host address field, and the route type field is used to indicate a type included in the refined filtering information. For example, different values of the route type field may correspond to different combination schemes of the refined filtering information, and any one or a combination of the distinguisher, the policy color, and the endpoint corresponds to a different value of the route type field.

The foregoing case is described by using an example in which the second network device sends the filtering information to the first network device, so that the first network device obtains the filtering information. The first network device may alternatively obtain the filtering information in another manner. For example, the policy transmission apparatus further includes a fifth obtaining module, configured to obtain the filtering information from a controller. Optionally, the filtering information is carried in a border gateway protocol BGP packet. In this case, the controller may send the filtering information to the first network device by sending the BGP packet to the first network device.

Optionally, the SR policy transmission apparatus is used in a route reflector. Certainly, the SR policy transmission apparatus may alternatively be another network device or the like that has a similar application scenario requirement.

When an integrated unit is used, the policy transmission apparatus that is used in the first network device and that is provided in this application may include a processing module, a storage module, and a communication module. The processing module may be configured to control and manage an action of the policy transmission apparatus. For example, the processing module may be configured to support the policy transmission apparatus in performing the actions performed by the first network device in S301, S302, and S303. The storage module may be configured to support the policy transmission apparatus in storing program code, data, and the like. The communication module may be configured to support the policy transmission apparatus in communicating with another device.

The processing module may be a processor or a controller. The processing module may implement or execute logical blocks, modules, and circuits in various examples described with reference to content disclosed in this application. The processor may alternatively be a combination, for example, a combination including one or more microprocessors or a combination of a digital signal processor (DSP) and a microprocessor, for implementing a computing function. The storage module may be a memory. The communication module may be a device, for example, a radio frequency circuit, a Bluetooth chip, or a Wi-Fi chip, that interacts with another electronic device.

In an embodiment, when the processing module is a processor, the storage module is a memory, and the communication module is a communication interface, the policy transmission apparatus in this embodiment may be a network device having the structure shown in FIG. 2.

Figure 7:
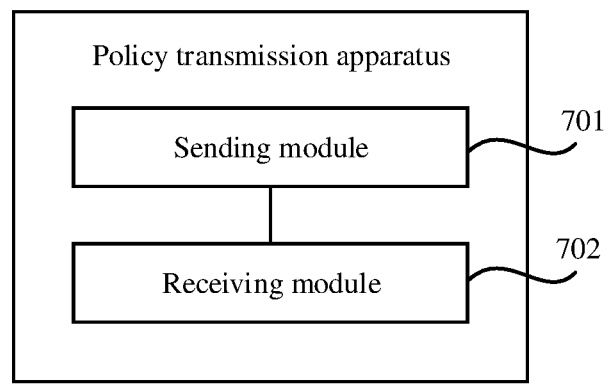
FIG. 7 is a block diagram of another policy transmission apparatus according to an embodiment of this application.

FIG. 7 is a block diagram of another policy transmission apparatus according to an embodiment of this application. The policy transmission apparatus may be, for example, the second network device in the foregoing embodiments. As shown in FIG. 7, the policy transmission apparatus includes a sending module 701 and a receiving module 702.

The sending module 701 is configured to send filtering information to a first network device, where the filtering information includes an SR policy address family identifier and a device identifier of the second network device. For an operation performed by the sending module 701, refer to S301 in the embodiment shown in FIG. 3. Details are not described in this embodiment of this application again.

The receiving module 702 is configured to receive an SR policy sent by the first network device, where a type of the SR policy belongs to a type indicated by the SR policy address family identifier, and the SR policy includes the device identifier of the second network device. For an operation performed by the receiving module 702, refer to the operation related to the second network device in S303 in the embodiment shown in FIG. 3. Details are not described in this embodiment of this application again.

In conclusion, in the policy transmission apparatus provided in this embodiment of this application, the sending module can send the filtering information to the first network device, so that the first network device can obtain the filtering information, and can filter the at least one received SR policy based on the filtering information. The first network device is prevented from sending, to the second network device, an SR policy that is not sent to the second network device, to reduce transmission of useless SR policies in a network transmission system, and reduce load of the network transmission system.

For an SR policy that is obtained through filtering by the first network device and that is to be sent to the second network device, a type of the SR policy belongs to the type indicated by the SR policy address family identifier, and a device identifier that is carried in the SR policy and that is of a network device to which the SR policy needs to be sent is the same as the device identifier of the second network device.

Optionally, the filtering information further includes refined filtering information. In this case, the SR policy sent by the first network device to the second network device is obtained by filtering the at least one SR policy based on the SR policy address family identifier, the device identifier of the second network device, and the refined filtering information. In this case, for the SR policy that is obtained through filtering by the first network device and that is to be sent to the second network device, a type of the SR policy belongs to the type indicated by the SR policy address family identifier, a device identifier that is carried in the SR policy and that is of a network device to which the SR policy needs to be sent is the same as the device identifier of the second network device, and related information carried in the SR policy matches the refined filtering information in the filtering information.

Optionally, a type of the refined filtering information includes at least one of a distinguisher, a policy color, and an endpoint.

Optionally, in a first manner in which the second network device sends the filtering information to the first network device, the filtering information is carried in an ORF packet, and the second network device may send the filtering information to the first network device by sending the ORF packet to the first network device. The filtering information is carried in the outbound route filter ORF packet. The ORF packet includes an address family identifier field, a subsequent address family identifier field, and an ORF entry field. The SR policy address family identifier is carried in the address family identifier field and the subsequent address family identifier field, and the device identifier of the second network device is carried in the ORF entry field.

Optionally, the ORF packet may further include an ORF type field, and the ORF type field indicates that the ORF packet carries indication information and is used for SR policy filtering. Certainly, the ORF type field may not be used to indicate that the ORF packet carries the indication information, and is used for SR policy filtering.

Optionally, in a second manner in which the second network device sends the filtering information to the first network device, the filtering information is carried in a CP-ORF packet, and the second network device may send the filtering information to the first network device by sending the CP-ORF packet to the first network device. The filtering information is carried in the covering prefixes outbound route filter CP-ORF packet. The CP-ORF packet includes an address family identifier field, a subsequent address family identifier field, and a virtual private network route target field. The SR policy address family identifier is carried in the address family identifier field and the subsequent address family identifier field, and the device identifier of the second network device is carried in the virtual private network route target field.

Optionally, in a third manner in which the second network device sends the filtering information to the first network device, the filtering information is carried in a CP-ORF packet. The CP-ORF packet includes an address family identifier field, a subsequent address family identifier field, a virtual private network route target field, a route type field, and a host address field. The SR policy address family identifier is carried in the address family identifier field and the subsequent address family identifier field, the device identifier of the second network device is carried in the virtual private network route target field, the refined filtering information is carried in the host address field, and the route type field is used to indicate the type included in the refined filtering information.

When an integrated unit is used, the policy transmission apparatus that is used in the second network device and that is provided in this application may include a processing module, a storage module, and a communication module. The processing module may be configured to control and manage an action of the policy transmission apparatus. For example, the processing module may be configured to support the policy transmission apparatus in performing the actions performed by the second network device in S301 and S303. The storage module may be configured to support the policy transmission apparatus in storing program code, data, and the like. The communication module may be configured to support the policy transmission apparatus in communicating with another device.

For the processing module, the storage module, and the communication module, respectively refer to the processing module, the storage module, and the communication module in the foregoing policy transmission apparatus used in the first network device. Details are not described in this embodiment of this application again.

In an embodiment, when the processing module is a processor, the storage module is a memory, and the communication module is a communication interface, the policy transmission apparatus in this embodiment may be a network device having the structure shown in FIG. 2.

Figure 8:
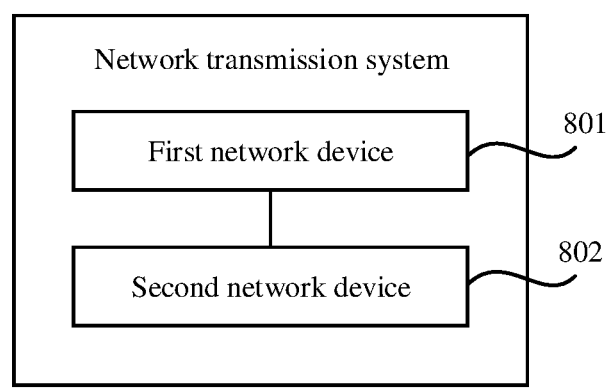
FIG. 8 is a schematic diagram of a structure of another network transmission system according to an embodiment of this application.

An embodiment of this application provides a network transmission system. As shown in FIG. 8, the network transmission system may include a first network device 801 and a second network device 802. For functions of the first network device 801 and the second network device 802 in the system, refer to the functions that can be implemented by the corresponding network devices in the foregoing embodiments. Details are not described in this embodiment of this application again.

Optionally, the network transmission system may further include a controller. In a possible implementation, the controller is configured to send filtering information to the first network device, so that the first network device can obtain the filtering information from the first network device.

An embodiment of this application provides a computer-readable storage medium. The storage medium stores a computer program. The computer program is configured to perform the method performed by the first network device in any policy transmission method provided in embodiments of this application.

An embodiment of this application provides another computer-readable storage medium. The storage medium stores a computer program. The computer program is configured to perform the method performed by the second network device in any policy transmission method provided in embodiments of this application.

An embodiment of this application provides a computer program product including instructions. When the computer program product is run on a network device, the network device is enabled to perform the method performed by the first network device in any policy transmission method provided in embodiments of this application.

An embodiment of this application provides a computer program product including instructions. When the computer program product is run on a network device, the network device is enabled to perform the method performed by the second network device in any policy transmission method provided in embodiments of this application.

All or some of the foregoing embodiments may be implemented by using software, hardware, firmware, or any combination thereof. When being implemented by using software, all or some of the foregoing embodiments may be implemented in a form of a computer program product, and the computer program product includes one or more computer instructions. When the computer program instructions are loaded and executed on a computer, the procedures or functions according to embodiments of this application are all or partially generated. The computer may be a general-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk drive, or a magnetic tape), an optical medium, a semiconductor medium (for example, a solid-state drive), or the like.

In this application, the terms "first", "second", and the like are merely intended for description, and shall not be understood as an indication or implication of relative importance. The term "at least one" means one or more, and the term "a plurality of" means two or more, unless otherwise expressly limited.

For different types of embodiments such as the method embodiments and the apparatus embodiments provided in embodiments of this application, reference may be made to each other. This is not limited in embodiments of this application. A sequence of the operations of the method embodiment provided in embodiments of this application can be appropriately adjusted, and the operations can be correspondingly added or deleted based on a situation. Any method that can be easily figured out by a person skilled in the art within the technical scope disclosed in this application shall fall within the protection scope of this application. Therefore, details are not described again.

In the corresponding embodiments provided in this application, it should be understood that the disclosed system, device, and apparatus may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical or other forms.

The units described as separate parts may or may not be physically separate, and parts described as units may or may not be physical units, may be located at one position, or may be distributed on a plurality of network devices (for example, terminal devices). A part or all of the units may be selected based on an actual requirement to achieve the objectives of the solutions of embodiments.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
at least one processor; and
a non-transitory computer readable storage medium storing a program that is executable by the at least one processor, the program including instructions for:
receiving filtering information from a second network device, wherein the filtering information comprises a segment routing (SR) policy address family identifier and a device identifier of the second network device, and wherein the device identifier of the second network device is a router identifier (ID) of the second network device;
receiving at least one SR policy; and
identifying and sending one or more SR policies in the at least one SR policy to the second network device based on the filtering information, wherein a type of each SR policy of the one or more SR policies belongs to a type indicated by the SR policy address family identifier, and each SR policy of the one or more SR policies comprises the device identifier of the second network device;
wherein the filtering information is carried in an outbound route filter (ORF) packet, and the ORF packet comprises an address family identifier field, a subsequent address family identifier field, and an ORF entry field; and
wherein the SR policy address family identifier is carried in the address family identifier field and the subsequent address family identifier field, and the device identifier of the second network device is carried in the ORF entry field.

2. The apparatus according to claim 1, wherein the program further includes instructions for:
obtaining an address of the second network device, wherein the address of the second network device corresponds to the device identifier of the second network device; and
sending the one or more SR policies to the second network device based on the address of the second network device and the filtering information.

3. The apparatus according to claim 1, wherein the filtering information further comprises refined filtering information.

4. The apparatus according to claim 3, wherein a type of the refined filtering information comprises a distinguisher.

5. The apparatus according to claim 3, wherein a type of the refined filtering information comprises a policy color.

6. The apparatus according to claim 3, wherein a type of the refined filtering information comprises an endpoint.

7. The apparatus according to claim 1, wherein the apparatus is used in a route reflector.

8. The apparatus according to claim 1, wherein the program includes instructions for:
filtering the at least one SR policy using the filtering information, to identify the one or more SR policies.

9. An apparatus, comprising:
at least one processor; and
a non-transitory computer readable storage medium storing a program that is executable by the at least one processor, the program including instructions for:
sending filtering information to a first network device, wherein the filtering information comprises a segment routing (SR) policy address family identifier and a device identifier of a second network device, and wherein the device identifier of the second network device is a router identifier (ID) of the second network device; and
receiving one or more SR policies sent by the first network device, wherein a type of each SR policy of the one or more SR policies belongs to a type indicated by the SR policy address family identifier, and each SR policy of the one or more SR policies comprises the device identifier of the second network device; and
wherein the filtering information is carried in a covering prefixes outbound route filter (CP-ORF) packet, and the CP-ORF packet comprises an address family identifier field, a subsequent address family identifier field, and a virtual private network route target field; and
wherein the SR policy address family identifier is carried in the address family identifier field and the subsequent address family identifier field, and the device identifier of the second network device is carried in the virtual private network route target field.

10. The apparatus according to claim 9, wherein the filtering information further comprises refined filtering information.

11. The apparatus according to claim 10, wherein a type of the refined filtering information comprises a distinguisher.

12. The apparatus according to claim 10, wherein a type of the refined filtering information comprises a policy color.

13. The apparatus according to claim 10, wherein a type of the refined filtering information comprises an endpoint.

14. The apparatus according to claim 9, wherein the program further includes instructions for:
sending an address of the second network device to the first network device, wherein the address of the second network device corresponds to the device identifier of the second network device.

15. A network transmission system, comprising:
a first network device; and
a second network device;
wherein the first network device is configured to:
receive filtering information from the second network device, wherein the filtering information comprises a segment routing (SR) policy address family identifier and a device identifier of the second network device, and wherein the device identifier of the second network device is a router identifier (ID) of the second network device;
receive at least one SR policy; and
identify and send one or more SR policies in the at least one SR policy to the second network device based on the filtering information, wherein a type of each SR policy of the one or more SR policies belongs to a type indicated by the SR policy address family identifier, and each SR policy of the one or more SR policies comprises the device identifier of the second network device; and
wherein the second network device is configured to:
receive the one or more SR policies sent by the first network device; and
wherein the filtering information is carried in a covering prefixes outbound route filter (CP-ORF) packet, and the CP-ORF packet comprises an address family identifier field, a subsequent address family identifier field, a virtual private network route target field, a route type field, and a host address field; and
wherein the SR policy address family identifier is carried in the address family identifier field and the subsequent address family identifier field, the device identifier of the second network device is carried in the virtual private network route target field, refined filtering information is carried in the host address field, and the route type field indicates a type comprised in the refined filtering information.

16. The network transmission system according to claim 15, wherein the first network device being configured to send the one or more SR policies in the at least one SR policy to the second network device based on the filtering information comprises the first network device being configured to:
obtain an address of the second network device, wherein the address of the second network device corresponds to the device identifier of the second network device; and
send the one or more SR policies to the second network device based on the address of the second network device and the filtering information.

17. The network transmission system according to claim 15, wherein the filtering information further comprises refined filtering information.

18. The network transmission system according to claim 17, wherein a type of the refined filtering information comprises a distinguisher.

19. The network transmission system according to claim 17, wherein a type of the refined filtering information comprises a policy color.

20. The network transmission system according to claim 17, wherein a type of the refined filtering information comprises an endpoint.

* * * * *